(12) United States Patent
Iwamoto et al.

(10) Patent No.: US 6,325,382 B1
(45) Date of Patent: Dec. 4, 2001

(54) NON-CONTACT TYPE MECHANICAL SEAL

(75) Inventors: Yasutaka Iwamoto, Osaka; Masaaki Furuya, Tokyo; Masahito Ikehara, Tokyo; Yoshimitsu Sekiya, Tokyo, all of (JP)

(73) Assignees: Nippon Pillar Packing Co., Ltd., Osaka; Shin-Etsu Chemical Co., Ltd.; Mayekawa Mfg. Co., Ltd., both of Tokyo, all of (JP)

( * ) Notice: Subject to any disclaimer, the term of this patent is extended or adjusted under 35 U.S.C. 154(b) by 0 days.

(21) Appl. No.: 09/576,125

(22) Filed: May 22, 2000

(30) Foreign Application Priority Data

| May 21, 1999 | (JP) | ................................................. | 11-140970 |
| Nov. 2, 1999 | (JP) | ................................................. | 11-313062 |

(51) Int. Cl.[7] ..................................................... F16J 15/54
(52) U.S. Cl. ........................... 277/368; 277/387; 277/412
(58) Field of Search ................................... 277/358, 368, 277/412, 387, 361

(56) References Cited

U.S. PATENT DOCUMENTS 5,468,002 * 11/1995 Wasser ................................. 277/361
5,700,011 * 12/1997 Bainachi et al. .
5,719,560 * 2/1998 Lorenzen ........................ 277/361 X

* cited by examiner

Primary Examiner—Robert J. Sandy
Assistant Examiner—Karlena D. Schwing
(74) Attorney, Agent, or Firm—Griffin & Szipl, P.C.

(57) ABSTRACT

A static pressure non-contact type mechanical seal that exhibits and maintains a high sealing function or performance for a prolonged period even when sealing gases containing foreign matter such as oil. A labyrinth seal (7) comprising a plurality of annular grooves (71) and annular plates (72) extending into the grooves is provided, the labyrinth seal partitioning a region C on the outside diameter side of the seal faces (31, 41) in the seal case (2) from the inside region A of a gas treatment machine (1). The seal case is provided with a return passage (8) communicating with the bottom portions of the annular grooves 71 and opening into the inside region A of the machine. The seal case also includes a purge gas feed passage for supplying purge gas to the region C on the outside diameter side of the seal faces, the purge gas pressure being higher than that in the inside region. A foreign matter recovery passage (101) is also provided in the seal case, the recovery passage opening into the region C on the outside diameter side of the seal faces and communicating with a foreign matter recovery tank (103) maintained under the same pressure as the region C.

12 Claims, 5 Drawing Sheets

NON-CONTACT TYPE MECHANICAL SEAL

FIELD OF THE INVENTION

The present invention relates to a non-contact type mechanical seal that is mounted as a shaft seal on rotary equipment or machines such as wet-type compressors, mixers and pumps handling gases containing liquid or solid foreign matter such as oil, moisture and sludge.

DESCRIPTION OF THE PRIOR ART

It is known to provide a non-contact type mechanical seal configured to seal the internal or inside region within a rotary machine from the outside or atmospheric region. A rotary seal ring on the rotary shaft and a stationary seal ring on the seal case side are kept in a non-contact state by generating static pressure between opposed faces of the two seal rings, thereby creating a seal between the two regions. Unlike contact type mechanical seals in which the faces of the seals are in sliding contact as they rotate relative to each other, the non-contact type mechanical seal is free from such problems as seizing or burning up under dry operating conditions, and is suitable as a shaft seal for rotary equipment handling gases.

However, in applications where the gas to be sealed contains liquid foreign matter such as oil or solid foreign matter such as sludge, the foreign matter may creep into, stick to, or accumulate on, the seal faces. This could put the static pressure between the seal faces out of control, resulting in decreased or lost seal function.

SUMMARY OF THE INVENTION

It is an object of the present invention to provide a non-contact type mechanical seal (static pressure gas seal) for rotary machines, the seal preventing foreign matter in the gas being contained from creeping between the seal faces so that a good sealing function or performance is maintained for a long period.

This object is achieved by providing a non-contact type mechanical seal comprising a cylindrical seal case mounted horizontally on the rotary machine with one end opening into the inside region of the machine, a stationary seal ring held, relatively non-rotatable but movable in the axial direction, at the other end of the seal case, a rotary seal ring provided on the inside region side of the stationary seal ring and clamped on a rotary shaft passing through the seal case and the stationary seal ring, thrusting means that urges the stationary seal ring toward the rotary seal ring, and a static pressure generating mechanism to generate static pressure between the opposed seal faces of the two seal rings, wherein there is provided a labyrinth seal between the seal case and the rotary shaft, the labyrinth seal comprising a plurality of annular grooves provided side by side in the axial direction on the inner circumferential portion of one end of the seal case and a plurality of annular plates provided side by side in the axial direction on the outer circumferential portion of the rotary shaft, the annular plates extending into the annular grooves, thus separating the area on the outer circumferential side of the seal faces within the seal case from the inside region of the rotary machine.

The seal of the invention may be provided with a return passage that communicates with the bottom portions of the annular grooves and which opens into the inside region of the machine so that foreign matter entering the labyrinth seal is returned to the inside region. The lower surface of the return passage may be tapered to slope down toward an opening into the inside region of the machine thus assisting in the return of the foreign material.

The seal case is preferably provided with a purge gas feed passage for supplying purge gas into the space on the outer circumferential side of the rotary and stationary seal faces, the purge gas being supplied at a pressure higher than the pressure on the inside region of the machine.

The seal case may also be provided with a foreign matter recovery passage that opens into the region on the outer circumferential side of the rotary and stationary seal faces. The recovery passage may be connected to a foreign matter recovery tank, the pressure in the recovery tank being maintained at the same level as the pressure in the outer circumferential side region. In equipment having a horizontal rotary shaft, it is desirable to provide the return passage under the rotary shaft and have the foreign matter recovery passage opening into the outer circumferential side region at a location under the rotary shaft.

The non-contact type mechanical seal of the present invention is especially suitable as a shaft seal for rotary equipment or machines such as wet-type compressors, mixers and pumps treating gases containing liquid or solid foreign matters such as oil, moisture and sludge. When the equipment is a compressor, it is preferable that the feeding pressure of the purge gas and the seal gas supplied between the rotary and stationary seal faces are controlled according to the pressure in the inside region of the compressor. This compensates for pressure changes in the inside region of the compressor such as might occur in the event of a power failure, or at the time of startup or stopping of the compressor. Also, the foreign matter collected in the foreign matter recovery tank may be returned to the inside region of the machine by using the discharge gas of the compressor.

BRIEF DESCRIPTION OF THE DRAWINGS

Preferred embodiments of the present invention will be illustrated in conjunction with the accompanying drawings, in which.

DESCRIPTION OF THE PREFERRED EMBODIMENTS

Figure 1:
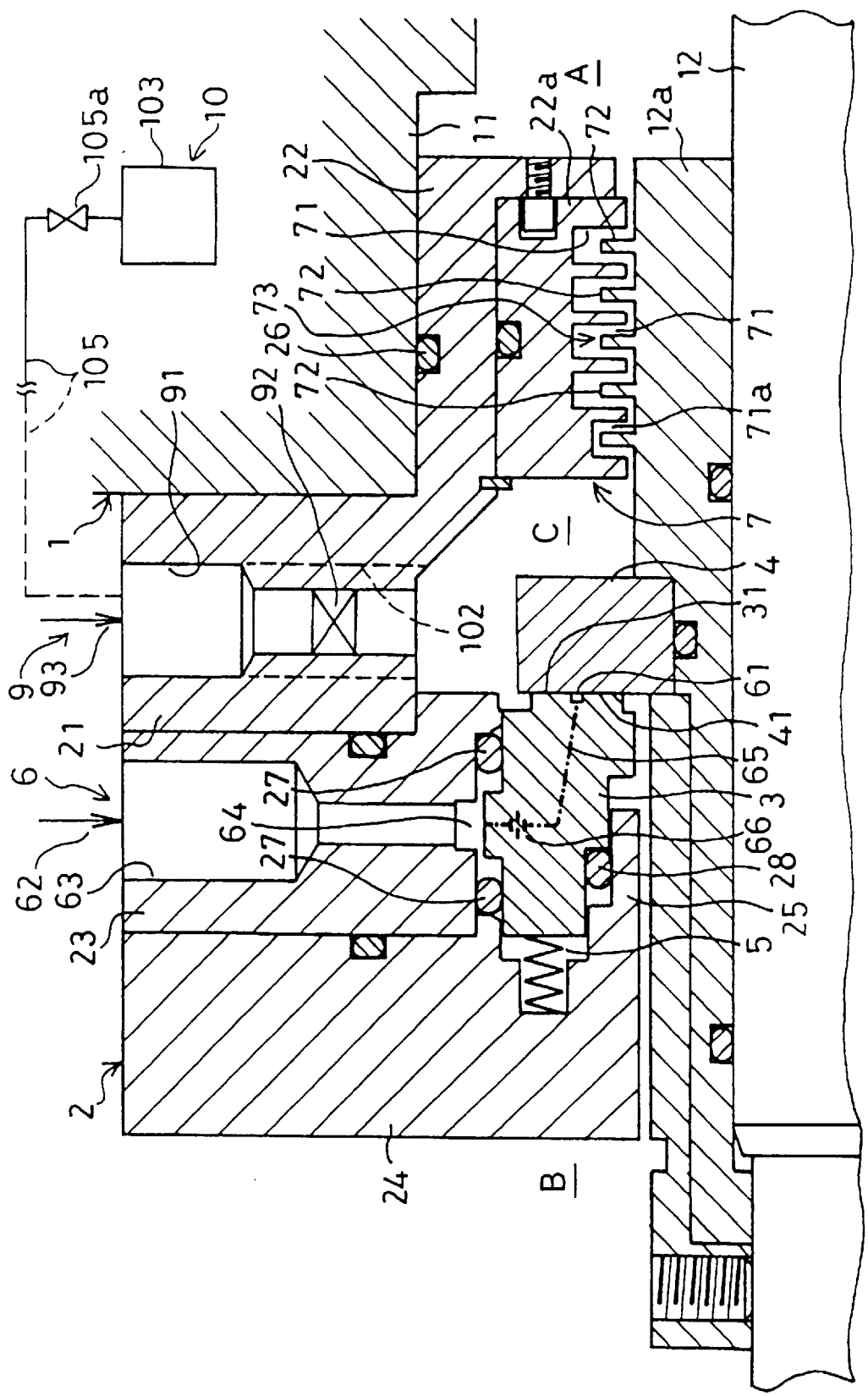
FIG. 1 is a sectional side view of the upper half of an example of the mechanical seal according to the present invention.

FIGS. 1 to 4 show a first embodiment of a non-contact type seal according to the present invention. The seal is a static pressure type gas seal shown mounted in the shaft seal section 11 of a rotary machine or piece of rotary equipment 1 such as a wet-type compressor for treating gas inside the machine (inside gas) containing liquid foreign matter such as water and oil or solid foreign matter such as sludge. The purpose of the seal is to prevent leakage gas from the region A inside the machine to the atmosphere or region B outside the machine. The non-contact type mechanical seal comprises a seal case 2, a stationary seal ring 3, a rotary seal ring 4, thrusting means 5, a static pressure generating mechanism 6, a labyrinth seal 7, a return passage 8 (FIG. 2), a purge gas feeding mechanism 9 and a foreign matter recovery mechanism 10. Rotary equipment 1 includes a rotary shaft 12 that extends horizontally from a drive unit (not shown) in region B, through the shaft seal section 11, and into the region A inside the machine. It should be understood that, as used herein, the words front, before or forward denote left while such terms as rear, behind, back and backward indicate right in FIG. 1 or 2.

The seal case 2 is cylindrical in shape and horizontally mounted on the shaft seal section 11. The seal case 2 comprises a cylindrical block 21 fit to and mounted on the front end of the shaft seal section 11, a cylindrical mounting portion 22 integrally formed on the rear end of the block 21 and fit to and mounted on the inner circumferential surface of the shaft seal section 11, a first retaining portion 23 fixed in the front end portion of the cylindrical block 21, an annular second retaining portion 24 fixed in the front end portion of the first retaining portion 23 and a cylindrical third retaining portion 25 extending backward from the inner circumferential portion of the second retaining portion 24. An O-ring 26 is provided between mounting portion 22 and shaft seal section 11.

The inside of seal case 2 opens into the inside region A through the mounting portion 22 which forms the end portion (rear end portion) of the seal case 2. In the illustrated embodiment the mounting portion 22 comprises an inner circumferential portion 22a that is a different cylindrical component part. The rotary shaft 12 concentrically passes through the seal case 2 and in the illustrated embodiment the portion of the shaft within the seal case is provided with a sleeve 12a which rotates with the shaft.

The stationary seal ring 3 is concentric with, but spaced from, the rotary shaft 12 and is held relatively non-rotatable but movable in the axial direction by the retaining portions 23, 24 and 25 which form the other end portion (front end portion) of seal case 2. The inner circumferential surfaces of the first retaining portion 23 and second retaining portion 24 bear on the outer circumferential surface of seal ring 3 while the outer circumferential surface of the third retaining portion 25 bears on the inner circumferential surface of the seal ring. The retaining portions cooperate to retain the seal ring 3 while permitting it to move axially.

Figure 2:
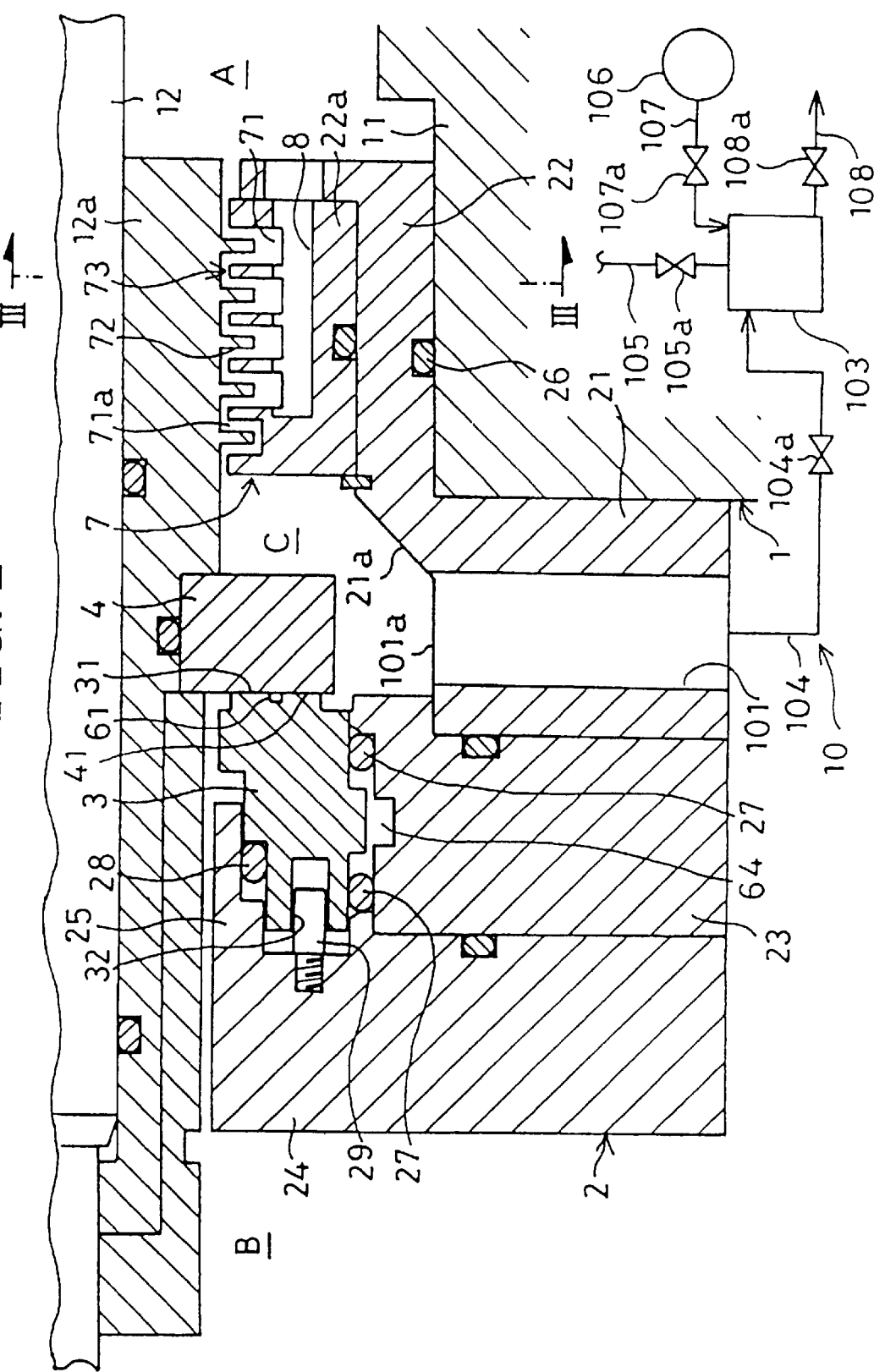
FIG. 2 is a sectional side view of the lower half of the same mechanical seal.
Figure 3:
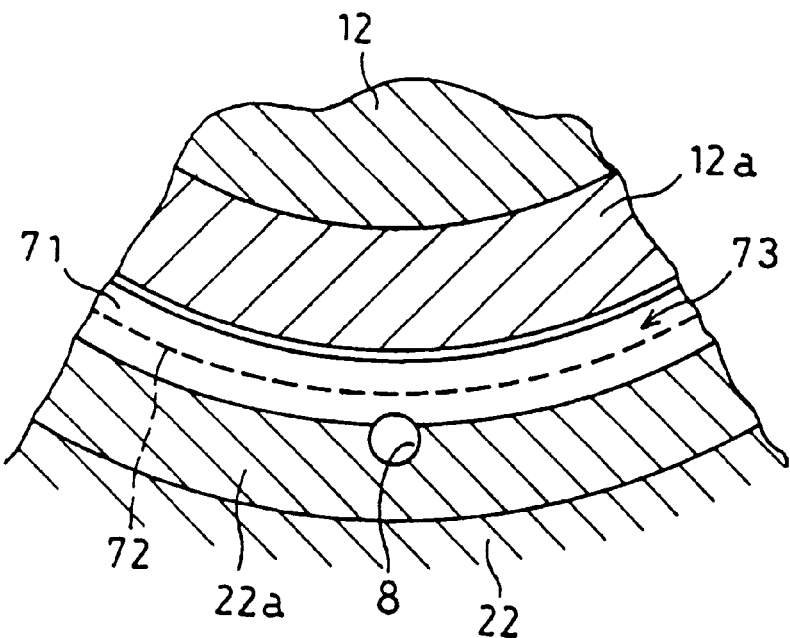
FIG. 3 is a sectional view taken along the line III—III in FIG. 2.

Although the stationary seal ring 3 is allowed to move forward and backward within a limited range, it is prevented from rotating by rotation stopper pins 29, one of which is shown in FIG. 2. Pins 29 are secured in the second retaining portion 24 and extend into engaging holes 32 provided in the front end portion of the seal ring. The seal ring 3 is held by the first retaining portion 23 in such a way that only a very small part of the outer circumferential surface of the seal ring on the seal face side is exposed to a purge gas region C.

The rotary seal ring 4 is placed on the inside region A side (rear side) of the stationary seal ring 3 and rotates with the shaft 12. Seal ring 4 is placed within the cylindrical block 21 of the seal case 2 and is fixed on the sleeve 12a of the rotary shaft 12, so as to directly face the stationary seal ring 3. The seal faces 31, 41, that is, the opposed end faces of the two seal rings 3, 4, have a smooth surface perpendicular to the axis of shaft 12.

The thrusting means 5 comprises one or more coil springs placed between the stationary seal ring 3 and the second retaining portion 24 as shown in FIG. 1. The purpose of thrusting means 5 is to urge the stationary seal ring 3 toward the rotary seal ring 4 and generate a closing force that works to close the seal faces 31, 41.

The static pressure generating mechanism 6 comprises a static pressure generating groove 61 formed on the face 31 of the stationary seal 3, a series of seal gas feed passages 63, 64 and 65, and a flow restrictor 66 as shown in FIG. 1. The static pressure generating mechanism 6 generates a static pressure (opening force) between the seal faces 31, 41 that works to open the seal faces 31,41 by moving seal 3 against the pressure exerted thereon by the thrusting means 5.

Figure 4:
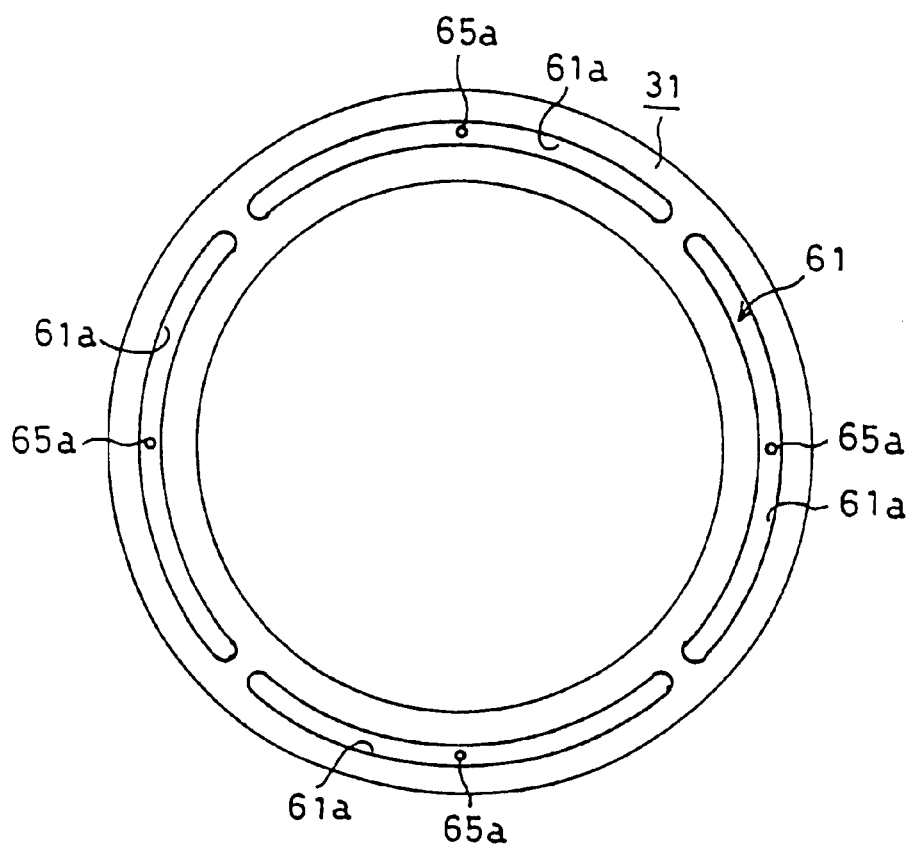
FIG. 4 is a front view of the face of the stationary seal.

The static pressure generating groove 61 may be a continuous shallow recess or a series of recesses 61a formed in a circular shape concentric with the stationary seal face 31 as shown in FIG. 4. In this case, the feed passage 65 is provided with branch passages downstream of the restrictor 66, each branch path terminating at its downstream end at an opening 65a in one of the recesses 61a.

An external source (not shown) supplies seal gas 62 to the recesses 61a via passage 63 (FIG. 1) in seal case 2. Passage 63 communicates with an annular space 64 formed between the outer circumferential surface of the stationary seal ring 3 and the inner circumferential surface of the first retaining portion 23. Annular space 64 extends around the outer circumference of seal ring 3 and is sealed by the O-rings 27. From annular space 64 the seal gas flows through the passage 65 and its branch passages to the openings 65a (FIG. 4) in the arc-shaped recesses 61a which form the static pressure generating groove 61. The passage 63 is connected to a seal gas supply source (not shown) so as to supply the seal gas 62 to the static pressure generating groove 61 through the seal gas feeding passages 63, 64 and 65.

The seal gas 62 is selected according to seal conditions from among the gases that are harmless to humans even if they leak out into region B, or that have no adverse effect on the gas in the inside region A. The gas may, for example, be clean nitrogen gas. It is noted that the seal gas 62 is fed only while rotary equipment 1 is in operation and the supply is cut off after the operation is suspended. Rotary equipment 1 is started only after the seal gas 62 starts to be fed and the seal faces 31, 41 are held in a proper non-contact state. The supply of the seal gas 62 is cut off only after rotary equipment 1 is put out of operation and the rotary shaft 12 comes to a complete stop.

The flow restrictor 66 includes an orifice, capillary tube and porous component part that restrict the flow of seal gas. The flow restrictor 66 is placed at a point of the seal gas feeding passage 65 upstream of the point where passage 65 branches.

When seal gas 62 is applied to the passage 63 it passes through annular passage 64 and feed passage 63 to enter the static pressure generating groove 61 generates an opening force between the seal faces 31, 41 to open the same. Thus, the seal faces 31, 41 are held in a non-contact state with equilibrium established between the opening force and the closing force exerted by the springs 5 working to close the seal faces 31, 41. That is, the seal gas 62 fed into the static pressure generating grooves 61a forms a fluid film between the seal faces 31, 41. This fluid film acts as a shield or seal in the area between the outside diameter and inside diameter of the seal faces 31, 41. The pressure of the seal gas 62 and the force of springs 5 are set so as to maintain the seal faces 31, 41 at a proper distance, generally 5 to 15 μm. Since the flow of seal gas 62 is restricted by the restrictor 66 before being fed into the static pressure generating groove 61, the gap between the seal faces 31 and 41 is automatically adjusted and held at a proper distance even if there is a change in the gap. For example, if the gap between the seal faces 31, 41 increases because of vibration of the rotary equipment 1, the equilibrium will be lost between the amount of seal gas flowing between the seal faces 31, 41 from the static pressure generating groove 61 and the amount of seal gas fed into the static pressure generating groove 61 through the flow restrictor 66. When this occurs, the pressure in the static pressure generating groove 61 decreases and the opening force becomes smaller than the closing force, so that the gap between the seal faces 31, 41 decreases to a proper gap. If the gap between the seal faces 31, 41 decreases, then there will be a rise in the pressure within the static pressure generating groove 61 caused by flow through restrictor 66. The opening force will overcome the closing force so that the gap between the seal faces 31, 41 increased to a proper distance.

The labyrinth seal 7 comprises a plurality of annular grooves 71 arranged side by side in the axial direction around the inner circumferential portion 22a of the seal mounting portion 22, and a plurality of annular plates 72 disposed side by side in the axial direction on the outer circumference of the shaft sleeve 12a, the plates extending into the annular grooves. Grooves 71 and plates 72 form a zigzag passage 73 through which the purge gas region C on the outer circumferential side of the seal faces 31, 41 communicates with the inside region A of the rotary equipment. The gaps between plates 72 and the bottoms of grooves 71 are made as small as possible, consistent with the requirement that they never touch. It will be understood that grooves 71 may be formed in seal mounting portion 22 if portions 22 and 22a of the cylindrical block 21 are formed as a single piece.

The return passage 8 (FIG. 2) communicates with the bottom of the annular grooves 71 and opens into the inside region A. Preferably, the return passage 8, which is circular in section, extends horizontally under the shaft 12 and opens into the zigzag passage 73 at the bottoms of all the annular grooves 71 except for the annular groove 71a nearest region C.

The purge gas feeding mechanism 9 comprises a purge gas feed passage 91 which passes through the cylindrical block 21 of the seal case 2 and opens into purge gas region C, and an orifice 92. The purge gas feeding mechanism 9 is designed to feed purge gas 93 into region C under a pressure higher than the pressure in region A. The purge gas 93 flows slowly into purge gas region C after passing through an orifice 92, and maintains region C with a purge gas atmosphere under a pressure higher than that in region A. Generally, the pressure of purge gas 93 is set approximately 2 bar higher than the pressure in region A and is maintained at the same pressure level as seal gas 62. The purge gas 93, which may be clean nitrogen, is selected on the same basis as seal gas 62.

The purpose of the foreign matter recovery mechanism 10 is to collect any foreign matter that manages to pass from interior region A into region C via the zigzag passage 73. Recovery mechanism 10 comprises a foreign matter recovery passage 101 (FIG. 2) and a pressure retaining passage 102 (FIG. 1) both provided in the seal case 2, and a closed foreign matter recovery tank 103 (shown in FIGS. 1 and 2), provided outside the seal case 2. A return pipe 104 connects recovery passage 101 to the recovery tank and a gas feed pipe 105 connects the recovery tank to passage 91. A compressor 106 is connected to the recovery tank via a compressor discharge pipe 107 having a shut-off valve 107a therein. Foreign matter is discharged from recovery tank 103 via a foreign matter discharge pipe 108 having a shut-off valve 108a therein.

The foreign matter recovery passage 101 has an opening 101a into purge gas region C just under the rotary seal ring 4 as shown in FIG. 2. The inner circumferential surface of the cylindrical block 21 is provided with a tapered surface 21a a so that any foreign matter creeping into region C is led into recovery passage 101. From passage 101, the foreign matter may flow into recovery tank 103 when valve 104a is opened. The foreign matter accumulates in tank 103 and may be discharged from the system when valve 108a is opened.

Because valve 108a is normally closed during operation of machine 1, compressor 106, via pipe 107, tank 103 and pipe 105, is able to maintain the purge gas region C at a pressure chosen to be substantially equal to the seal gas pressure. The purge gas and seal gas pressures are chosen to be greater than the pressure in region A thus inhibiting the passage of gas from region A into region C.

When passing through the zigzag passage 73 of the labyrinth seal 7, the inside gas is subjected to centrifugal force generated by the rotation of the annular plates 72. Foreign matter contained in the inside gas is thus spun out and discharged from the bottom of the annular grooves 71 to the return passage 8 and then into the inside region A. In the border area between the inside region A and the purge gas region C, the inside gas is circulated between the zigzag passage 73 and the return passage 8, and thus there is little chance that foreign matter contained in the inside gas will creep into the purge gas region C through passage 73.

Furthermore, foreign matter managing to reach the purge gas region C through the labyrinth seal 7, flows down the tapered surface 21a into the opening 101a and is quickly discharged by the recovery mechanism 10 from the purge gas region C via 101. Thus, there is no problem of foreign matter accumulating in the purge gas region C and affecting the performance of the mechanical seal. By merely operating the first to fourth shut-off valves 104a, 105a, 107a, 108a, it is possible to dispose of a large quantity of foreign matter without suspending the operation of the mechanical seal.

In operating the mechanical seal in the present embodiment, the foreign matter recovering tank 103 is kept under the same pressure as in the purge gas region C by opening the first and second shut-off valves 104a, 105a and closing the third and fourth shut-off valves 107a, 108a. In this setup, foreign matter which creeps into the purge gas region C is recovered in the recovery tank 103 through the recovery passage 101 and the first connecting pipe 104. Since the purge gas region C is under the same pressure as the recovery tank 103, the foreign matter is quickly discharged into the foreign recovery tank 103. Thus, the foreign matter is prevented from accumulating in the purge gas region C and affecting the seal function or performance of the seal rings 3, 4.

When the recovered foreign matter in tank 103 reaches a certain level, the compressor 106 is started with the valves 104a and 105a closed and with the valves 107a and 108a open. This discharges the foreign matter in tank 103 through the foreign matter discharge pipe 108. Since the shut-off valves 104a and 105a are closed in this process, the pressure in the purge gas region C will not fall. Because the purge gas region C and the inside region A do not change in pressure, the foreign matter can be discharged from tank 103 without suspending the operation of the mechanical seal. After the foreign matter in the tank 103 is discharged, the valve 108a is closed so that compressor 106 again raises the pressure in the tank. When the pressure in tank 103 rises to the same, or about the same, level as in the purge gas region C, the valve 107a is closed and the compressor is stopped. Finally, the valves 104a and 105a are opened so that the recovery tank 103 may communicate with the purge gas region C, thus bringing the system to its original state prior to the discharge of foreign matter from the recovery tank. By repeating this process, it is possible to remove foreign matter from the purge gas region C without suspending the operation of the mechanical seal even if large quantities of foreign matter find their way into the purge gas region C.

As set forth above, the foreign matter contained in the inside gas is effectively blocked from creeping in between the seal faces 31, 41. Thus, the mechanical seal of the present invention is capable of functioning well for a prolonged period of time without encountering the problems of prior art seals.

Figure 5:
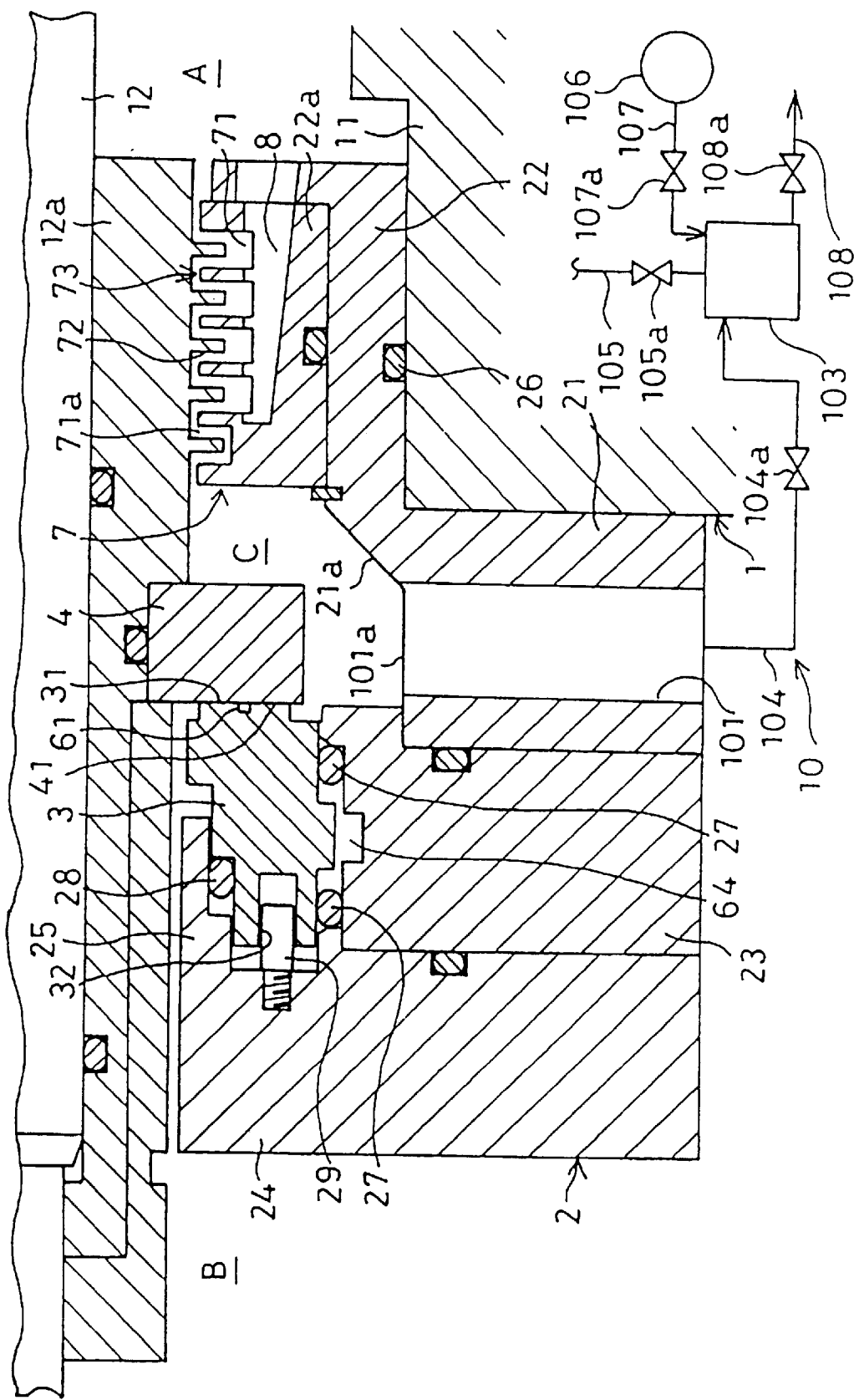
FIG. 5 is a sectional side view of a variation of the same non-contact type mechanical seal.

While there has been described a preferred embodiment of the present invention, it will be understood that the invention is not limited to the described embodiment and that changes and variations may be made without departing from the basic principle of the invention. For example, the return passage 8 may be provided in any number and in any shape as long as the function of the labyrinth seal 7 is not affected. The return passage 8 provided under the rotary shaft 12 in particular may be formed as shown in FIG. 5 so that the lower surface of the returning passage 8 slopes down toward the opening into the inside region A. This facilitates the movement of foreign matter toward the inside region A in the return passage.

The static pressure generating mechanism 6, purge gas feeding mechanism 9 and foreign matter recovering mechanism 10 may be configured according to the arrangement, function, operating conditions and other factors of rotary equipment 1. If the rotary equipment is a compressor, it is desirable to have those components arranged as shown in FIG. 6.

Figure 6:
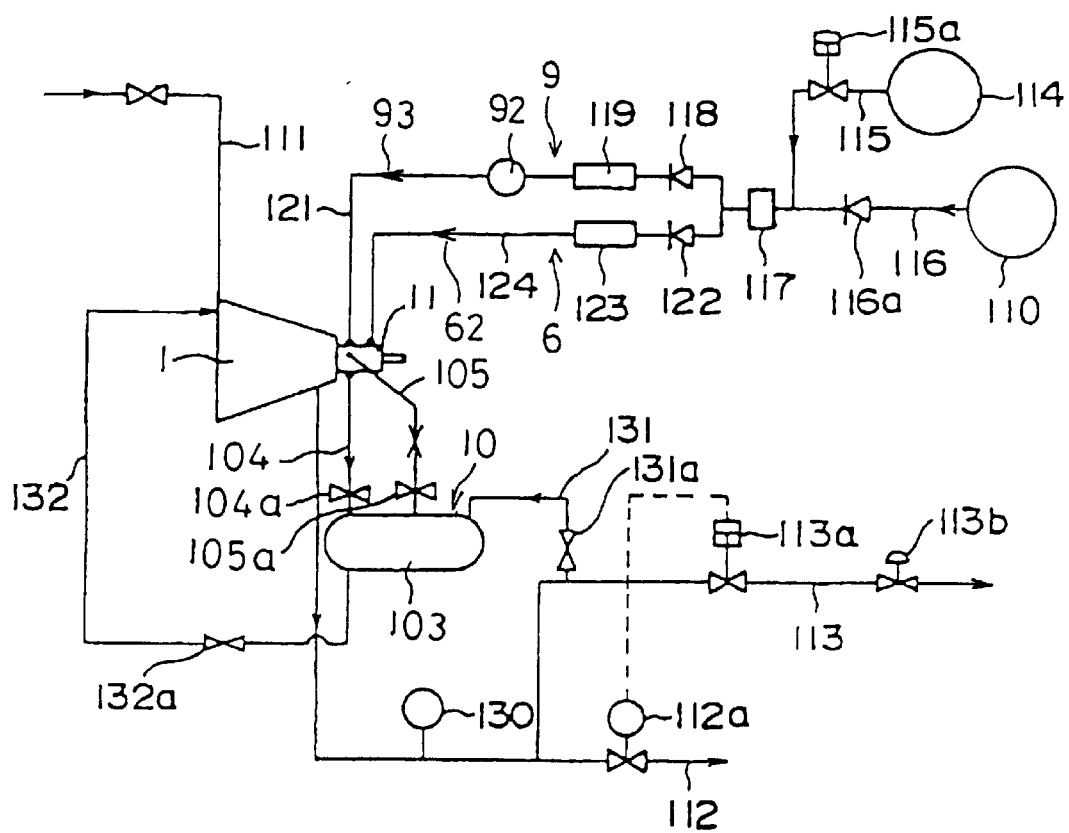
FIG. 6 system diagram showing a control system suitable for use with the non-contact mechanical seal when the seal is used as a shaft seal in a screw compressor.

FIG. 6 shows the piping and control systems of the mechanisms 6, 9 and 10 with the non-contact mechanical seal of the present invention applied as a shaft seal in a screw compressor 1. This mechanical seal is identical in construction with the non-contact mechanical seal shown in FIGS. 1 to 4 or FIG. 5 except for points that will be described. In FIG. 6, parts that corresponds to those in FIGS. 1 to 4 or FIG. 5 are designated by like reference characters.

In the compressor 1, the inside pressure (pressure in inside region A or in the rotary chamber) could suddenly go up, raising the pressure of the discharge gas of the compressor 1. Such an unusual pressure or emergency pressure rise could be caused when the rotary shaft 12 undergoes a transient change in rotational speed as it comes to a stop because of power failure or at the time of startup or the stopping of the compressor. For this reason, the feeding pressure of seal gas 62 and purge gas 93 can not be set only on the basis of the inside pressure during normal operation, but also has to be adjusted to the higher emergency pressure. However, the setting of the feeding pressure of seal gas 62 and purge gas 93 on the basis of the emergency pressure presents problems. If gas under higher pressure than the emergency pressure, by some 2 bar, is supplied to the non-contact mechanical seal as seal gas 62 and purge gas purge gas 93, the pressure in the purge gas region C rises more than necessary as compared with the inside pressure. This hinders smooth operation of the compressor. In addition, the supply facilities for seal gas 62 and purge gas 93 have to be enlarged and become complicated, thereby increasing initial cost and running costs.

The static pressure generating mechanism 6 and purge gas feeding mechanism 9 shown in FIG. 6 are arranged to address these problems. Two gas sources are provided: a low pressure gas source 110 and a high pressure gas source 114, so that the feeding pressure of seal gas 62 and purge gas 93 can be adjusted depending on the inside pressure. The gas sources 110, 114 can supply a suitable gas, such as nitrogen gas, for example, as seal gas 62 and purge gas 93. The low pressure gas source 110 supplies seal gas 62 and purge gas 93 gas under a pressure some 2 bars higher than the normal inside pressure in compressor 1. The high pressure gas source 114 supplies seal gas 62 and purge gas 93 under a pressure some 2 bars higher than the emergency pressure. The gas source 114 is used only in an emergency such as a power failure, or at the time of startup or stopping of the compressor. The need for high pressure gas is small and a small-volume gas tank or cylinder may serve as the gas source 114.

The gas feed pipe 116 from the output of the low pressure gas source 110 is provided with a check valve 116a and, downstream therefrom, a gas filter 117. A gas feed pipe 115 is connected between the output of the high pressure gas feed source 114 and a point on pipe 116 intermediate valve 116a and filter 117. The pipe 115 is provided with a control valve 115a that is operated according to the inside pressure of the compressor 1. The control valve 115a is opened when the inside pressure of the compressor reaches the upper set pressure (set on the basis of the emergency pressure). The control valve 115a is closed when the inside pressure of the machine falls below the lower set pressure (set on the basis of the normal operation pressure).

Downstream of filter 117, the feed pipe 116 branches into two paths. One branch pipe 121 is connected to the purge gas feed passage 91 through a check valve 118, flow meter 119 and orifice 92. The orifice 92 may be provided as necessary on the purge gas feed passage 91 as shown in FIG. 1. The other branch pipe 124 is connected through a check valve 122 and flow meter 123 with the seal gas passage 63 (FIG. 1).

As shown in FIG. 6, the compressor output or discharge pipe 112 is provided with a gas discharge valve 112a. A gas release pipe 113 having a gas release valve 113a therein is connected with pipe 112. The arrangement is such that when the inside pressure of the compressor 1 rises to the upper set level, the gas discharge valve 112a is closed and the release valve 113a is opened to relieve the pressure. The pipe 113 has a pressure reducing valve 113b therein downstream of valve 113a so that the pressure in the inside region of the compressor is lowered to a specific level (lower set pressure) determined by valve 113b. In this connection, the gas release pipe 113 is connected with the gas discharge pipe 112 between the gas discharge valve 112a and a safety device 130 on the upstream side.

In the static pressure generating mechanism 6 and purge gas feed mechanism 9 that have just been described, the control valve 115a is closed in normal operation, with the seal gas 62 and purge gas 93 being supplied for normal operation from the low pressure gas feed source 110 to the static pressure generating groove 61 and the purge gas region C. If the pressure in the inside region of the compressor rises because of power failure, for example, the control valve 115a is opened to feed the high pressure seal gas 62 and purge gas 93 from the high pressure gas feed source 114 to the static pressure generating groove 61 and the purge gas region C. When the pressure in the inside region of the compressor is reduced to the lower set level as gas is released through the gas release pipe 113, the control valve 115a is closed and the seal and purge gases are again supplied from the low pressure source 110. Thus, the non-contact mechanical seal and the compressor 1 are kept in good operating condition because the seal and purge gases are always supplied at the proper pressure.

The foreign matter collected in recovery tank 103 from the purge gas region C must be disposed of regularly. In FIG. 6, the foreign matter recovery mechanism 10 is so arranged as to utilize the compressor 1 to recycle the foreign matter.

This eliminates the need for a separate foreign matter disposal unit. That, coupled with the arrangement of the static pressure generating mechanism 6 and purge gas feed mechanism 9 as described, simplifies the whole system including the compressor 1, reducing the size and substantially saving on the initial system cost and its running costs.

In the foreign matter recovery mechanism 10 shown in FIG. 6, the foreign matter recovery passage 101 (FIG. 2) and pressure retaining passage 102 (FIG. 1) are connected to the foreign matter recovery tank 103 through connecting pipes 104 and 105 having valves 104a and 105a, respectively, therein. The arrangement is as illustrated in FIGS. 1 and 2. However, in FIG. 6 the foreign matter collected in tank 103 is sent back to the rotary chamber (inside region A of the compressor 1) by utilizing the discharge gas from the compressor 1. The tank 103 is connected to the discharge side of compressor 1 by a pipe 131, and to the suction side of the compressor through a foreign matter return pipe 132. The pipe 131 is connected to the gas discharge pipe 112 between safety device 130 and valve 112a. The downstream end of the foreign matter return pipe 132 is connected with the suction opening of the compressor 1 or gas suction pipe 111 connected therewith. The pipes 131 and 132 are provided with shut-off valves 131a, 132a which open and close in conjunction with the valves 104a, 105a. In other words, valves 131a and 132a perform the same function as valves 107a, 108a in the embodiment of FIGS. 1 and 2.

As a specific amount of foreign matter is collected in the recovery tank 103, the valves 104a, 105a are closed while the valves 131a, 132a are opened. The compressor discharge gas is fed into the tank through the pipe 131 to discharge the foreign matter in the tank through the return pipe 132 back to the compressor 1. This eliminates the need for a separate air compressor 106 as used in the embodiment of FIGS. 1 and 2, as well as other facilities for disposal of the foreign matter from tank 103. The system structure and size are thus greatly reduced.

What is claimed is:

1. A non-contact type mechanical seal comprising:
    a cylindrical seal case mounted about a horizontally extending rotary shaft of a rotary machine, said seal case having at a first end an opening into an inside region of the machine,
    a non-rotatable stationary seal ring disposed at a second end of said seal case and movable in an axial direction;
    a rotary seal ring provided on an inside region side of the stationary seal ring and clamped on said rotary shaft, said rotary shaft passing through said seal case and said stationary seal ring;
    thrusting means for pressing said stationary seal ring toward said rotary seal ring; and,
    a static pressure generating mechanism for generating static pressure between opposed seal faces of the rotary and stationary seal rings,
    wherein a labyrinth seal is provided between said seal case and said rotary shaft, said labyrinth seal comprising a plurality of annular grooves disposed side by side in said axial direction on an inner circumferential portion of said seal case at said first end and a plurality of annular plates disposed side by side in said axial direction on an outer circumferential portion of said rotary shaft, the annular plates extending into the annular grooves, thus partitioning a region on an outer diameter side of said opposed seal faces within said seal case from said inside region of said rotary machine.

2. The non-contact type mechanical seal as defined in claim 1 wherein said seal case is provided with a purge gas feed passage for supplying purge gas, under a higher pressure than a pressure in said inside region, to said region on the outside diameter side of the seal end faces, said region on the outside diameter side being maintained under a higher pressure than a pressure in said inside region of said rotary machine, said seal case also having a foreign matter recovery passage opening into said region on the outside diameter side of the seal faces, said foreign matter recovering passage being connected to a foreign matter recovery tank maintained under the same pressure as said region on the outside diameter side of the seal faces.

3. The non-contact type mechanical seal as defined in claim 2 wherein said rotary equipment is a compressor, wherein a static pressure generating mechanism for feeding a seal gas between said seal faces and a purge gas feeding mechanism for feeding a purge gas into the purge gas region have a low pressure and a high pressure gas supply source, and wherein seal gas and purge gas are supplied from the low pressure gas supply source when the compressor is in normal operation and the seal gas and purge gas are supplied from the high pressure gas supply source when the pressure in said inside region of said machine rises from the normal operation level to a set level.

4. The non-contact type mechanical seal as defined in claim 2 wherein said rotary equipment is a compressor, wherein the foreign matter recovery tank is connected to a discharge side of said compressor through a gas lead-in pipe and to a suction side of said compressor through a foreign matter return pipe, and wherein part of the compressor discharge gas is fed into the foreign matter recovery tank from the gas lead-in pipe so that foreign matter in the tank may be returned into said compressor through said foreign matter return pipe.

5. A non-contact type mechanical seal as claimed in claim 2 wherein said rotary machine is a compressor.

6. A compressor having a non-contact type mechanical seal as claimed in claim 2.

7. The non-contact type mechanical seal as defined in claim 1 wherein said seal case is provided with a return passage communicating with bottom portions of said annular grooves and opening into the inside region of said rotary machine.

8. The non-contact type mechanical seal as defined in claim 7 wherein of said return passage has a lower surface tapered to slope down toward an opening into said inside region.

9. The non-contact type mechanical seal as defined in claim 8 wherein, with said rotary shaft placed in a horizontal position, said return passage is under said rotary shaft and wherein said foreign matter recovery passage opens into said region on the outside diameter side of the seal faces directly under said rotary shaft.

10. The non-contact type mechanical seal as defined in claim 1 wherein a fluid in said inside region of said machine is a gas containing liquid or solid foreign matter.

11. A non-contact type mechanical seal as claimed in claim 1 wherein said rotary machine is a compressor.

12. A compressor having a non-contact type mechanical seal as claimed in claim 1.

* * * * *